United States Patent [19]
Komatsu

[11] Patent Number: 4,656,381
[45] Date of Patent: Apr. 7, 1987

[54] MAGNETIC POLE STRUCTURE HAVING ATERNATE POLES EXTENDING FROM A POINT OF BASES, FOR A ROTARY ELECTRIC MACHINE

[76] Inventor: Fumito Komatsu, 1632-12, Nomura, Ooaza Hirooka, Shiojiri-shi, Nagano-ken, Japan

[21] Appl. No.: 726,257

[22] Filed: Apr. 23, 1985

[30] Foreign Application Priority Data

| Apr. 25, 1984 | [JP] | Japan | 59-85038 |
| Jun. 14, 1984 | [JP] | Japan | 59-122339 |
| Nov. 2, 1984 | [JP] | Japan | 59-232171 |
| Dec. 21, 1984 | [JP] | Japan | 59-271221 |
| Dec. 27, 1984 | [JP] | Japan | 59-278130 |

[51] Int. Cl.$^4$ .............................. H02K 21/12
[52] U.S. Cl. .................................. 310/257; 310/164
[58] Field of Search ............... 310/46, 49 R, 68 D, 310/154, 156, 162, 163, 254, 257, 269, 67 R

[56] References Cited

U.S. PATENT DOCUMENTS

| 2,312,101 | 2/1943 | Killam et al. | 310/156 |
| 3,119,941 | 1/1964 | Guiot | 310/156 |
| 3,310,696 | 3/1967 | Jullien-Davin | 310/164 |
| 3,383,534 | 5/1968 | Ebbs | 310/257 |
| 3,496,393 | 2/1970 | Reifman et al. | 310/257 |
| 4,059,780 | 11/1977 | Mazuir | 310/257 |

FOREIGN PATENT DOCUMENTS

| 1055677 | 4/1959 | Fed. Rep. of Germany | 310/164 |
| 1260154 | 3/1961 | France | 310/257 |

Primary Examiner—Patrick R. Salce
Assistant Examiner—D. L. Rebsch
Attorney, Agent, or Firm—Jordan and Hamburg

[57] ABSTRACT

A magnetic pole core for an electrorotary machine comprises a pair of circular base board sections holding a coil therebetween wound concentrically on a shaft, and a plurality of magnetic pole sections extending from the edge of each base board section over the outer circular face of the coil so as to be disposed alternately from the two base board sections. Each magnetic pole section is divided circumferentially into first and second magnetic pole pieces, one of which has a circumferentially extended section. A third magnetic pole piece may be provided between the first and second magnetic pole pieces.

20 Claims, 29 Drawing Figures

MAGNETIC POLE STRUCTURE HAVING ATERNATE POLES EXTENDING FROM A POINT OF BASES, FOR A ROTARY ELECTRIC MACHINE

FIELD OF THE INVENTION

The present invention relates to magnetic-pole cores for such electrorotary machines as DC and AC motors and a stepping motor, particularly to those magnetic-pole cores for electrorotary machines which have been improved in form.

RELATED ART STATEMENT

Those multipolar DC motors are already in actual use which comprise: a ring-shaped field magnet having 2n poles (n: an integer equal to or more than 2) magnetized around so that adjacent poles are opposite in polarity; an armature constructed in such a way that its coil with concentric windings on its shaft is placed flat between a pair of magnetic-pole cores, each core has its edge section bent over the circumferential face of the coil so that there may be magnetic poles which alternately extend from each core and alternately change in polarity; and a changeover means for changing the direction of current for the coil in harmony with the rotation of the armature.

When we construct such a multipolar DC motor by using a pair of magnetic-pole cores with rectangular magnetic-pole sections, the center of magnetic pole of the field magnet will coincide with the center of magnetic pole of the magnetic-pole section of armature at start-up (i.e., spontaneous stop position), resulting in generation of start-up dead-point. Thus, with DC motors, the start-up dead-point exists at the polarity changeover point of commutator, making their practical use unrealistic.

To solve the problem of start-up dead-point, in conventional electrorotary machines such as motors, an L-shaped auxiliary pole is provided in each interval between plural main magnetic poles disposed at equal intervals, or a frame serving to make the magnetic pole magnetically asymmetric is put on the core face with the magnetic pole, or some other means are adopted. These countermeasures aim at allowing the center of magnetic pole of the field magnet to deviate by a constant angle from the center of magnetic pole of the magnetic-pole section of armature, thereby avoiding the start-up dead-point.

The above-described conventional countermeasures resort to using additional materials on the magnetic pole (main magnetic pole) to avoid the start-up deadpoint. However, this additional use of materials necessarily result in disadvantages such as complex structure, increased size, and cost increase.

Another disadvantage is involved in conventionally-improved electrorotary machines: They are characterized in that the efficiency is maximized at a constant load torque, whereas the starting torque is extremely smaller than the maximum efficiency load at some rotary angles. It follows as a disadvantage that start-up is impossible unless load is small and that the overall efficiency is very low.

In view of the above-described unfavorable situation, the present inventor succeeded in avoiding the start-up dead-point by modifying the form of magnetic-pole section of the magnetic-pole core. This modification consists of extending the face of the core, which forms the magnetic circuit for the concentrically-wound coil and is positioned close to the field magnet, in the relative rotary direction of the armature, thereby making the form of the core face, positioned close to the field magnet, magnetically asymmetric with respect to the center of the magnetized pole on the field magnet. The magnetic asymmetry allows the center of magnetic pole of the armature upon passage of current to appear at a position in the relative rotary direction of the armature a little away from the spontaneous stop position of the armature, upon interruption of current, under the influence of the attractive force of the field magnet. This modification has made it possible to adopt facile concentric winding for the armature coil, increase the number of windings, and raise the motor efficiency, thus offering multipolar DC motors capable of being essily subjected to flattening of the motor.

However, these motors with above modification applied could not be freed of such disadvantages as the following:

(1) The maximum of the starting torque as a function of rotary angle is considerably less than the load torque for the maximum efficiency.

(2) The variation in the attractive torque of the magnet is so much as to yield a considerable irregularity in rotation.

In general, a DC motor employing an above-mentioned concentrically-wound armature coil is provided with the changeover point of current to the armature where the center of magnetic pole of the armature coincides with the center of magnetic pole of the field magnet. Thus, when the magnetic-pole core provided on the armature is in the common form of rectangle and a motor stop has occurred with the center of magnetic pole of the armature in coincidence with the center of magnetic pole of the field magnet, start-up is no longer possible.

Even when the form of magnetic-pole core for the armature has been made magnetically asymmetric, impossible start-up may happen, i.e., the armature is caused to continue to stop, for example, if the armature is brought into a state of nonpassage of current when the armature and field magnet have coincided with each other with respect to the center of magnetic pole and the attractive torque between the field magnet and armature is less than the load torque.

In order that the DC motor with the above structure may avoid the startup dead-point, i.e., may start to rotate without fail, it is required that the attractive torque of the field magnet is more than the load torque when a current interruption has happened with the centers of magnetic poles of the armature and field magnet in coincidence with each other. Fulfilment of this requirement is effective for avoiding the start-up dead-point but will result in occurrence of irregular rotation of the armature since the peak attractive torque of the field magnet under no passage of current is too high.

The present inventor has found the following conditions effective for minimizing irregular rotations:

(a) For the position where the centers of the magnetic poles of the armature and field magnet coincide with each other, the attractive torque between the magnet and armature with no passage of current should a little exceed the load torque at start-up.

(b) At the position specified in (a) above, the torque specified in (a) should be close to the maximum torque.

The condition (b) cannot be fulfilled merely by the extension of the face of the armature core facing the field magnet. This is because, even if the length or width of the extended section of the core is varied, neither the maximum torque for the attractive torque specified in condition (a) can be varied, nor the maximum torque position is made arbitrarily adjustable.

On the other hand, the promotion of the efficiency of DC motors requires that the magnetic flux of the magnetic field should pass not only through the inside of the core enveloping the armature coil from both its flat faces but also through the part of the core facing the field magnet when the core is positioned between adjacent N-S poles of the field magnet poles.

For the above condition to be fulfilled, the gap between adjacent magnetic poles of different polarities on the core which provides magnetic poles of alternate different polarities over the circular face of the armature coil, should be made as short as possible. However, a decrease of the gap merely by the extension of the face of the coil facing the field magnet will pose a problem that the attractive torque of the field magnet is made so large that a large starting current is required.

OBJECT AND SUMMARY OF THE INVENTION

The object of the present invention is to offer a magnetic-pole core capable of avoiding start-up dead-point without fail for electrorotary machines, especially for such electrorotary machines as motors which are equipped with magnetic-pole cores bent to provide plural magnetic poles over the circular face of a concentrically-wound coil.

Another object of the present invention is to offer a magnetic-pole core capable of not only minimizing irregular rotation but also promoting the efficiency for such electrorotary machines as specified above.

The magnetic-pole core for electrorotary machines according to the present invention consists of a pair of base board sections putting a concentrically-wound coil in between and plural magnetic-pole sections extending from the edge of each base board section over the outer circular face of the coil and disposed alternately with respect to the two base board sections. The magnetic-pole section is characteristically divided into two subsections perpendicular to the circumferential direction of the coil, i.e., a first and a second magnetic-pole piece, and the first and/or second magnetic-pole pieces have an extended section formed which extends from the arm of each magnetic-pole piece vertical to the circumferential direction of the coil.

The characteristic structure is effective for ensuring the prevention of start-up dead-point since, upon passage of current for start-up, there will be a displacement between the center of the magnetic pole of the armature and the middle point of the field magnet in the circumferential direction or the middle point of adjacent poles of the field magnet in the circumferential direction. The characteristic structure is also effective for considerably reducing irregular rotations and promoting efficiency.

Furthermore, the adoption of the concentrically-wound coil is effective for facilitating the introduction of multipolar structure, reducing the thickness of electrorotary machines, driving at high voltages, and lowering construction cost.

For conventional motors of various types, increase in the number of poles has failed to make rotary torque available which are in harmony with the increase. On the contrary, however, the use of the magnetic-pole core according to the present invention allows the arrangement of rotary torques which are in harmony with the increase in the number of poles.

DETAILED DESCRIPTION OF THE PREFERRED EMBODIMENTS

Figure 1:
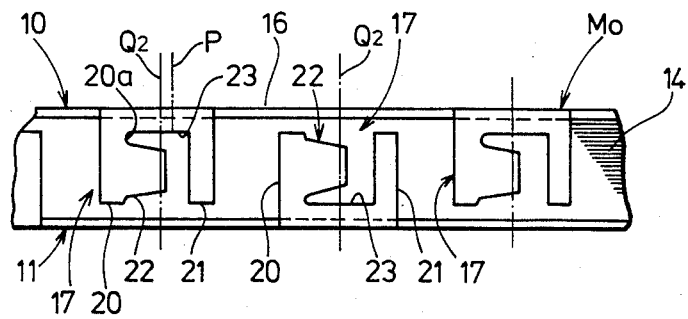
FIG. 1 is a partial expanded front view of a magnetic-pole core for electrorotary machines relating to the first embodiment.
Figure 2:
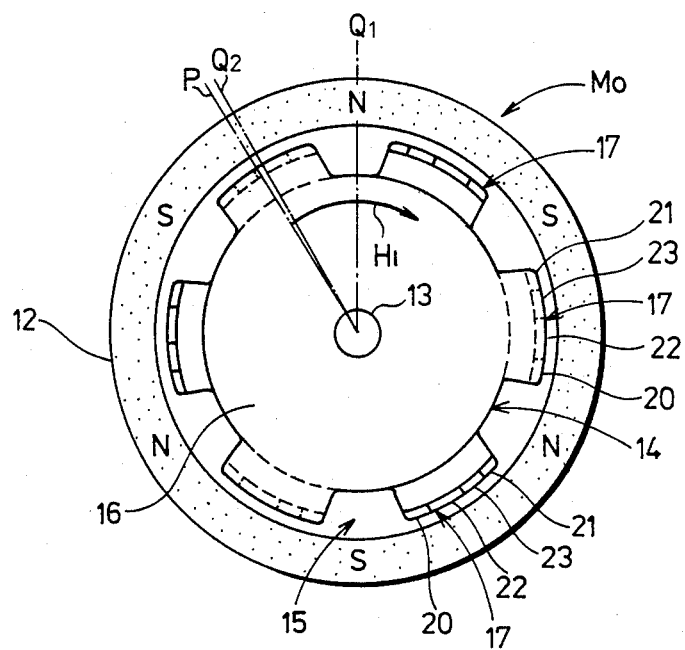
FIG. 2 is a plan illustrative of the major parts of an electrorotary machine.

FIGS. 1 and 2 refer to an inner-rotor motor Mo to which magnetic-pole cores 10 and 11 of the first embodiment of the present invention are applied.

First, the structure of the motor Mo is described below.

A ring-shaped field magnet 12 with three sets of N and S poles alternately magnetized is set outside as a stator.

A shaft 13 is wound with a coil 14.

A magnetic-pole core 10, relating to the present invention, covers one of the flat faces of the coil 14, and a magnetic-pole core 11, similar to the core 10, covers the other flat face of the coil 14. They are both fixed on the shaft 13, constituting an armature 15.

The magnetic-pole core 10 consists of a base board section 16, which is composed of a disk section and three radial sections each extending radially outward from three positions distributed at equal intervals on the circumference of the disk section, and magnetic-pole sections 17, each of which extends at an approximately right angle from each of the radial sections so as to be over the circumferential face of the coil 14. The magnetic-pole sections 17, three in number for each base board section, are formed in a body with the base board section 16.

One magnetic-pole section 17 is divided into two subsections perpendicular to the circumferential direction of the coil 14: a first magnetic-pole piece 20 and a second magnetic-pole piece 21. The first magnetic-pole piece 20 has an extended section 22 on its longitudinal side 20a in a body, which extends along the circumference of the coil 14 toward the second magnetic-pole piece 21. The extended section 22 is located in the middle of the longitudinal side 20a and has a form of trapezoid with its width getting narrower with the distance from the side 20a. Between the first and second magnetic-pole pieces 20 and 21 there is provided a third magnetic-pole piece 23 with its area selected to a certain constant value. The third magnetic-pole piece 23 is formed in a body with the first and second magnetic-pole pieces 20 and 21 and the base board section 16 (the radial section). The first and second magnetic-pole pieces 20 and 21, when the third magnetic-pole piece 23 and the extended section 22 are not considered, both have rectangular forms and almost the same heights. The interval between the first and second magnetic-pole pieces 20 and 21, the form and area of the extended section 22, and the area of the third magnetic-pole piece 23 are arbitrarily variable. Suitable variation of these parameters may result in optimal setting of characteristics as seen from FIGS. 3 and 4. Thus, the binary division of the magnetic-pole section 17 into the first and second magnetic-pole pieces 20 and 21 enables us to minimize the relative area of magnetic-pole section 17 of the armature 15 to the field magnet 12 and at the same time to ideally lessen the angular magnitude of the gaps between adjacent different-polarity magnetic poles; these effects will result in an extremely high efficiency.

Figure 3:
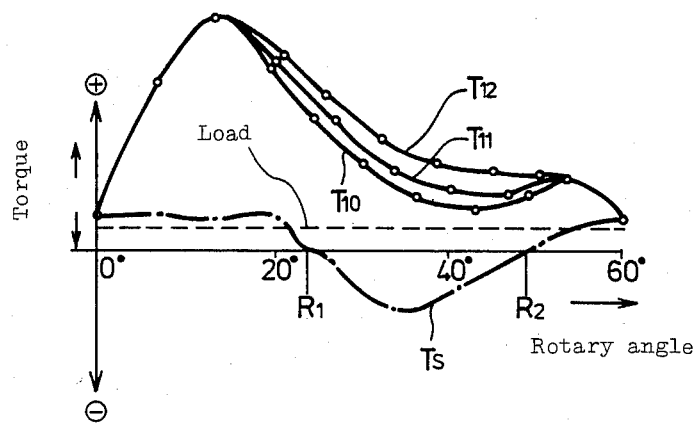
FIG. 3 shows rotary angle vs. torque characteristics for an electrorotary machine using the magnetic-pole core shown in FIG. 1.

The extended section 22 has an important effect with respect to the relative stop position of armature 15 and field magnet 12 when no current passes through the coil: The presence of the extended section 22 allows the center of the magnetic pole of armature 15 at start-up current flow to relatively deviate from the circumferential middle point of the pole of field magnet 12 (S or N pole) or the circumferential middle point between poles (between S and N poles) of the field magnet 12. Note that the stop position will be one of the two middle points, corresponding to different rotational directions, according as the total width of the magnetic-pole section 17 is relatively small or large. Thus, the extended section 17 makes the first and second magnetic-pole pieces 20 and 21 magnetically asymmetric by causing the geometrical center of the magnetic-pole section 17 to deviate from its magnetic center, thereby avoiding the start-up dead-point. The effect of the third magnetic-pole piece 23 is indicated in FIG. 3: When the area of the third magnetic-pole piece 23 is relatively small, the starting torque corresponds to the curve $T_{10}$, and as the area is increased, the starting torque changes to the curve $T_{11}$ and further to the curve $T_{12}$.

The magnetic-pole core 11 has a structure similar to the above-described core 10 and constitutes a pair of magnetic-pole cores with the core 10. The magnetic-pole sections of the cores 10 and 11 are bent in opposite directions but they are arranged over the circumferential face of the coil 14 so as to be the same with respect to the forms of constituent magnetic-pole pieces and to be disposed alternately with respect to the cores they belong to.

The operation of the motor Mo is described below. Let FIG. 2 refer to a DC motor which will rotate in the direction of arrow $H_1$. In FIG. 2, $Q_2$ represents the center between magnetic poles of the field magnet 12 and P the center between magnetic poles of the armature at passage of current. The direction of the current supplied to the coil 14 is changed over by a changeover means (not shown) to effect the rotational maintenance when the point $Q_1$ in FIG. 2 has come close to the point P.

The rotational torque (the attractive torque between armature and field magnet) of the armature under the conditions of no current passage and no load corresponds to the characteristic curve $T_s$ in FIG. 3. Now, let the rotational torque be $\oplus$ or $\ominus$ which is operative when the attractive torque causes the armature 15 to rotate to the right or left, respectively. The armature 15 is first caused to rotate to the right by the $\oplus$ rotational torque until it stops at the spontaneous stop position R1, which allows stable positioning under no load. As the armature 15 is caused to rotate further to the right, passing through the circumferential angle section generating $\ominus$ rotational torque, it reaches the unstable stop position R2, through which the armature 15 will rotate to the right toward the next spontaneous stop position R1 (not shown).

If we select the form, dimensions, etc. of the first, second, and third magnetic-pole pieces 20, 21, and 23, the extended section 22, etc., we may bring the displayed rotational torque to the neighborhood of the peak when the armature 15 and the field magnet 12 are at the changeover position for armature current with their magnetic-pole centers facing each other, and at the same time we may set this rotational torque at a value a little higher than the starting load torque.

Under load, the armature 15 will never stop at the position in FIG. 2 where the points P and $Q_1$ coincide with each other. It follows that the start-up dead-point may be avoided without fail, as well as that the irregularity in the rotation of armature 15 is minimized, since the rotational torque of the armature 15 is higher by a minimum necessary amount than the starting load torque.

The spontaneous stop position, as shown in FIG. 3, corresponds to the point $R_2$ in the attractive torque characteristic curve $T_s$ for no current passage. Although this point $R_2$ is located near the bottom of the starting torque characteristic curve $T_{10}$, the starting torque at start-up is allowed under the action of the third magnetic-pole piece 23 to be increased to $T_{11}$ or $T_{12}$. This starting torque may be adjusted as described above by selecting the area, etc. of the third magnetic-pole piece 23.

Figure 4:
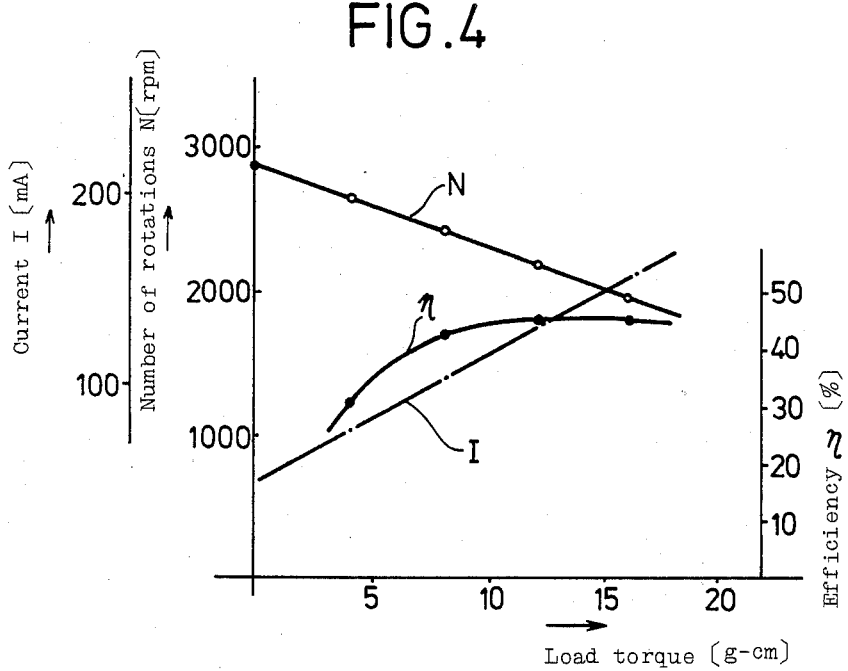
FIG. 4 shows load torque characteristics for an electrorotary machine using the magnetic-pole core shown in FIG. 1.
Figure 5:
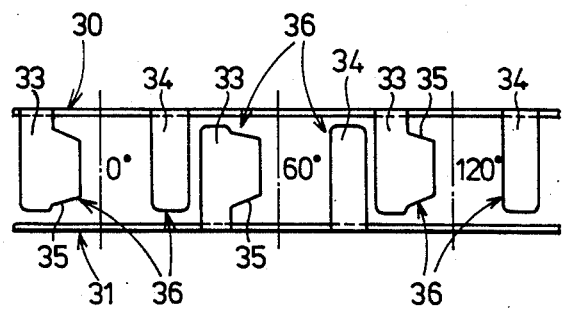
FIG. 5 is a partial expanded front view of a magnetic-pole core for electrorotary machines relating to the second embodiment.

FIG. 4 shows a load torque characteristic curve for a motor Mo equipped with the magnetic-pole cores 10 and 11 of FIG. 1. The specification for the model motor giving the characteristic of FIG. 4 is as follows:
  Rated voltage: 4.5 V
  Field magnet: I.D. 24.50
  Coil: 0.320, 550 turns FIG. 5 shows the second embodiment of the present invention, which corresponds to the magnetic-pole core 10 or 11, the first embodiment shown in FIG. 1, with the area of their third magnetic-pole piece 23 gradually decreased down to zero. This case is completely out of the effect of the third magnetic-pole piece. Concretely describing, one magnetic-pole section 36 of the magnetic-pole core 30 or 31 shown in FIG. 5 is equal in form to the corresponding section, shown in FIG. 1, minus the third magnetic-pole piece 23; in the long run, the magnetic-pole section 36 consists of the first magnetic-pole piece 33, the second magnetic-pole piece 34, and the extended section 35.

Figure 6:
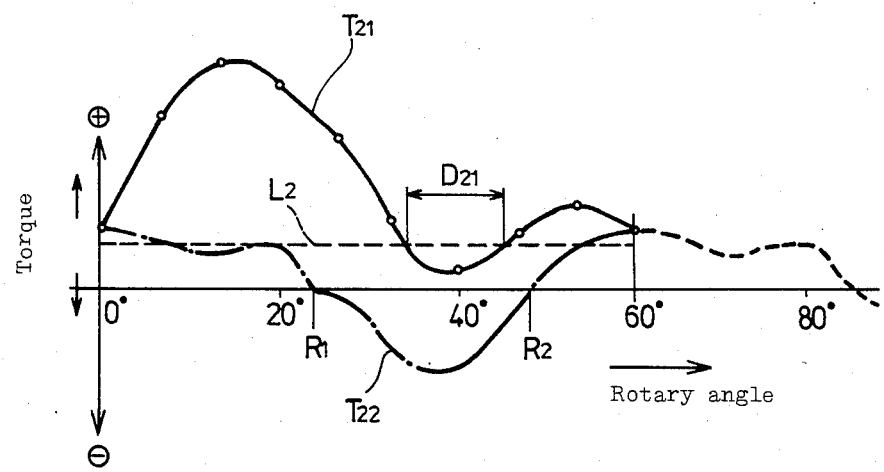
FIG. 6 shows rotary angle vs. torque characteristics for an electrorotary machine using the magnetic-pole core shown in FIG. 5.

FIG. 6 shows characteristics of a motor Mo, shown in FIG. 2, equipped with the magnetic-pole cores 30 and 31 of FIG. 5. In FIG. 6, $T_{21}$ is a starting torque characteristic and $T_{22}$ is an attractive torque characteristic under no passage of current and no load. As is evident from FIG. 6, the starting torque curve $T_{21}$ is equal to the characteristic curve $T_{10}$, shown in FIG. 2, with its valley section lowered.

Therefore, a start-up dead-point is sometimes generated in the angular range $D_{21}$ when the load $L_2$ is too large or under some other conditions. However, by setting such conditions as reducing the load and raising the starting voltage, we may avoid the start-up dead-point almost completely.

Figure 7:
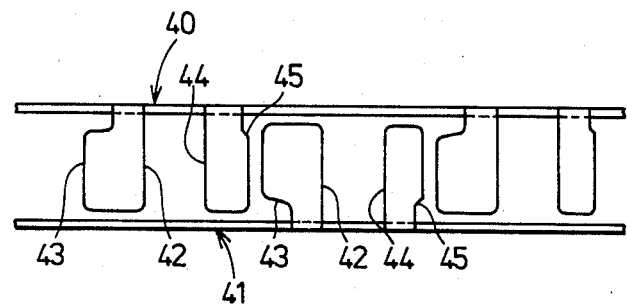
FIG. 7 is a partial expanded side view of a magnetic-pole core for electrorotary machines relating to the third embodiment.

FIG. 7 shows the third embodiment of the present invention. This embodiment is equal to the second embodiment, i.e., the magnetic-pole cores 30 and 31 shown in FIG. 5, changed in form. The difference between the second and third embodiments lies in that the magnetic-pole cores 40 and 41 in the third embodiment have their extended sections 43 extended from the first magnetic-pole piece 42 in the opposite direction and that the second magnetic-pole piece 44 also has a second extended section 45 provided extending in the direction opposite to that of the extended section 43.

Figure 8:
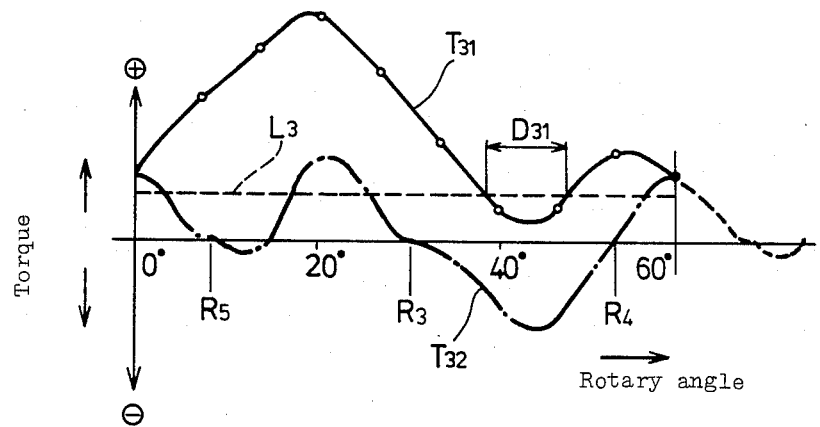
FIG. 8 shows rotary angle vs. torque characteristics for an electrorotary machine using the magnetic-pole core shown in FIG. 7.
Figure 9:
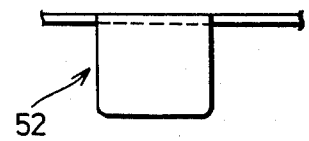
FIG. 9 is a front view of a rectangular magnetic-pole section of a magnetic-pole core.

FIG. 8 shows characteristics of a motor Mo, shown in FIG. 2, equipped with the magnetic-pole cores 40 and 41 of FIG. 7. In FIG. 8, $T_{31}$ is a starting torque characteristic and $T_{32}$ is an attractive torque characteristic under no passage of current and no load. The magnetic-pole core of the third embodiment also is sometimes involved in start-up dead-point in the angular range $D_{31}$ depending on the magnitude of load $L_3$, etc. Note that, in FIG. 8, $R_3$ is the spontaneous stop position, $R_4$ is the stable point, and that $R_5$ is the unstable stop position.

FIGS. 9–13 refer to the fourth embodiment.

Figure 10:
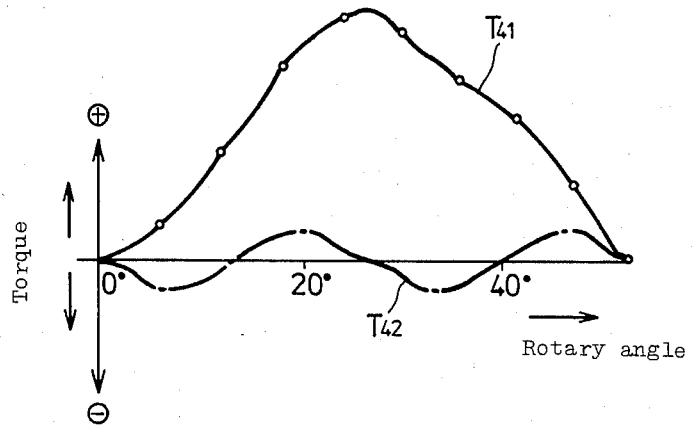
FIG. 10 shows rotary angle vs. torque characteristics for an electrorotary machine using the magnetic-pole core shown in FIG. 9.
Figure 11:
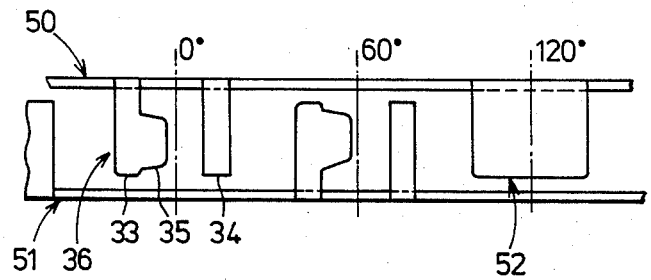
FIG. 11 is partial expanded front view of a magnetic-pole core for electrorotary machines relating to the fourth embodiment.

The fourth embodiment consists of partial adoption of the magnetic-pole sections 36 of the magnetic-pole cores 30 and 31 in the second embodiment (or the third embodiment). For example, the magnetic-pole sections 36 are provided every two positions, the rectangular magnetic-pole sections 52 shown in FIG. 9 being adopted for the remainder of magnetic-pole sections. FIG. 10 shows characteristics of a motor Mo, shown in FIG. 2, employing magnetic-pole cores equipped entirely with rectangular magnetic-pole sections 52 of selected area, where $T_{41}$ is a starting torque characteristic and $T_{42}$ is an attractive torque characteristic under no passage of current and no load. FIG. 11 shows magnetic-pole cores 50 and 51 with magnetic-pole sections 36 combined with rectangular magnetic-pole sections 52.

Figure 12:
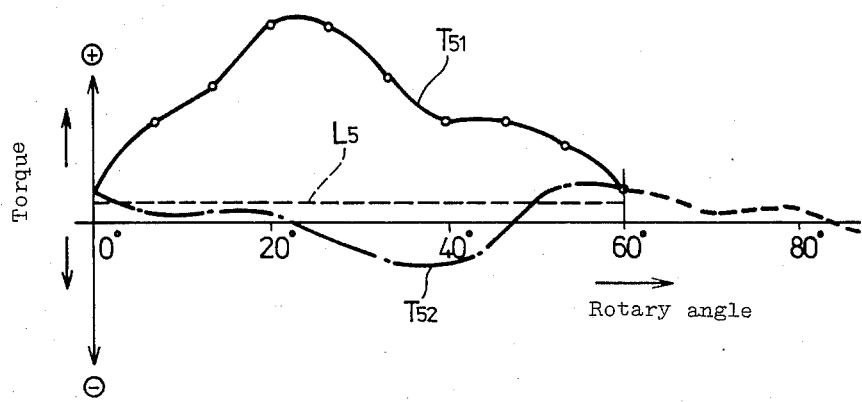
FIG. 12 shows rotary angle vs. torque characteristics for an electrorotary machine using the magnetic-pole core shown in FIG. 11.
Figure 13:
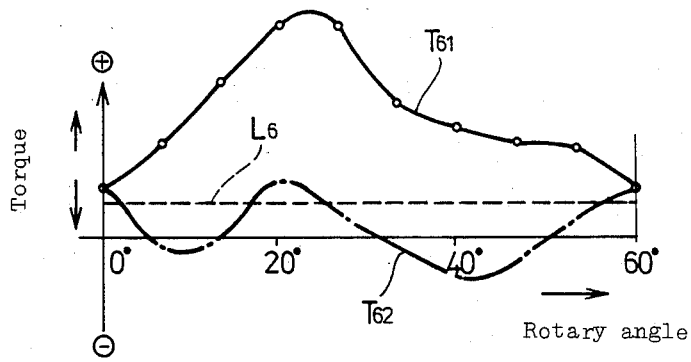
FIG. 13 shows rotary angle vs. torque characteristics for an electrorotary machine using a magnetic-pole core relating to a combination of the cores of FIGS. 7 and 9, a modification of the fourth embodiment.
Figure 14:
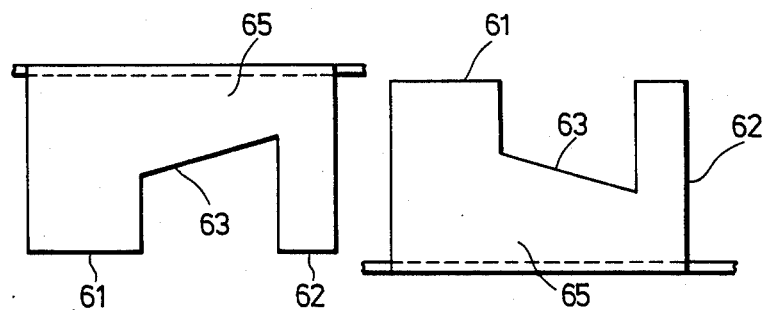
FIG. 14 is a partial front view of a magnetic-pole core for electrorotary machines relating to the fifth embodiment.
Figure 15:
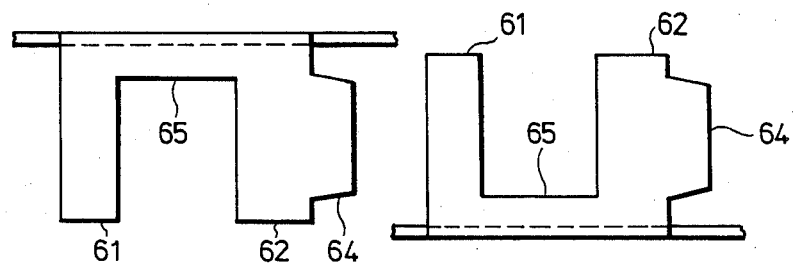
FIG. 15 is a partial front view of a magnetic-pole core for electrorotary machines relating to the sixth embodiment.
Figure 16:
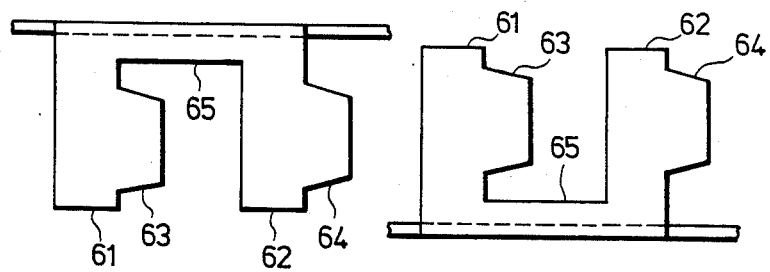
FIG. 16 is a partial front view of a magnetic-pole core for electrorotary machines relating to the seventh embodiment.
Figure 17:
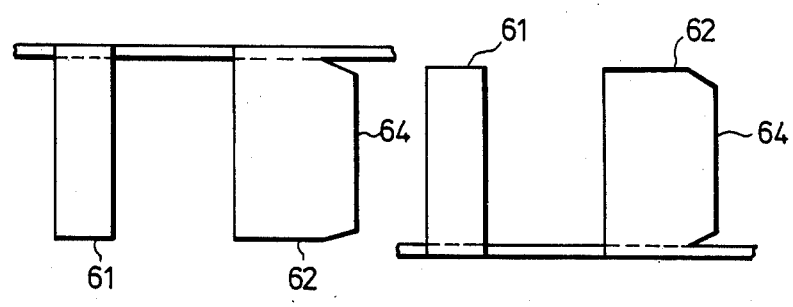
FIG. 17 is a partial front view of a magnetic-pole core for electrorotary machines relating to the eighth embodiment.
Figure 18:
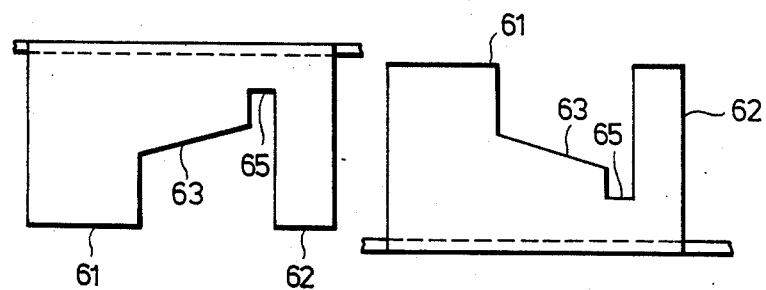
FIG. 18 is a partial front view of a magnetic-pole core for electrorotary machines relating to the ninth embodiment.

The fourth embodiment may be regarded as a modification of the first embodiment in which the rectangular magnetic section 52 has charge of the function of the third magnetic-pole piece 23 in the magnetic-pole cores 10 and 11. FIG. 12 shows torque characteristics of a motor Mo, shown ini FIG. 2, equipped with the magnetic-pole cores 50 and 51 of FIG. 11, and FIG. 13 shows torque characteristics of a motor Mo, shown in FIG. 2, equipped with magnetic-pole cores with the magnetic-pole sections of FIG. 7 combined alternately with the magnetic-pole sections of FIG. 9; in FIGS. 12 and 13, $T_{51}$ and $T_{61}$ are starting torque characteristics, $T_{52}$ or $T_{62}$ are attractive torque characteristics under no passage of current and no load, and $L_5$ and $L_6$ load lines. All the magnetic-pole cores are capable of avoiding start-up dead-point and are especially effective for multipolar motors.

FIGS. 14–18 show representative modifications of the form of magnetic-pole sections, corresponding to the 5–9th embodiments, respectively; in FIGS. 14–18, the first magnetic-pole piece, the second magnetic-pole piece, the extended section, the second extended section, and the third magnetic-pole piece are indicated by FIGS. 61, 62, 63, 64, and 65, respectively.

Figure 19A:
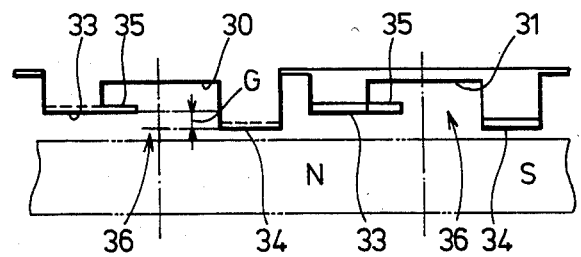
FIG. 19 shows a magnetic-pole core for electrorotary machines relating to the tenth embodiment, FIG. 19(A) and (B) being a partial expanded plan and a partial expanded front view, respectively.
Figure 19B:
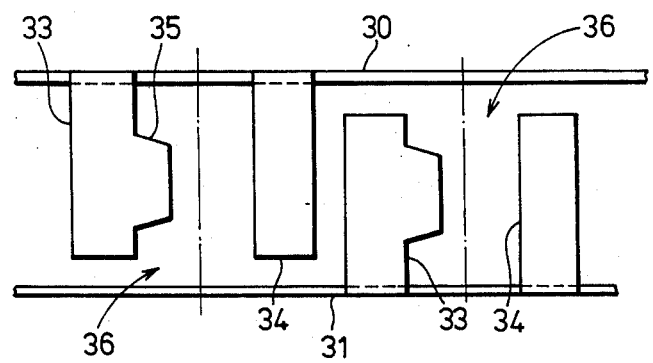

FIG. 19 shows the tenth embodiment, which is a modification of the second embodiment shown in FIG. 5 where the first and second magnetic-pole piece 33 and 34 are made located at different positions in the radial direction so that there will be the interval in the radial direction between them. Such a positioning with different levels in the radial direction also is effective for endowing the magnetic-pole section with magnetic assymmetry. Such a positioning with different levels is applicable not only to the magnetic-pole sections, hitherto described, with various forms but also to others of arbitrary forms. Note that the same figures have been used for corresponding parts in FIGS. 5 and 19.

Concrete descriptions will be made below of various electrorotary machines to which the magnetic-pole cores according to the present invention are applied.

Figure 20:
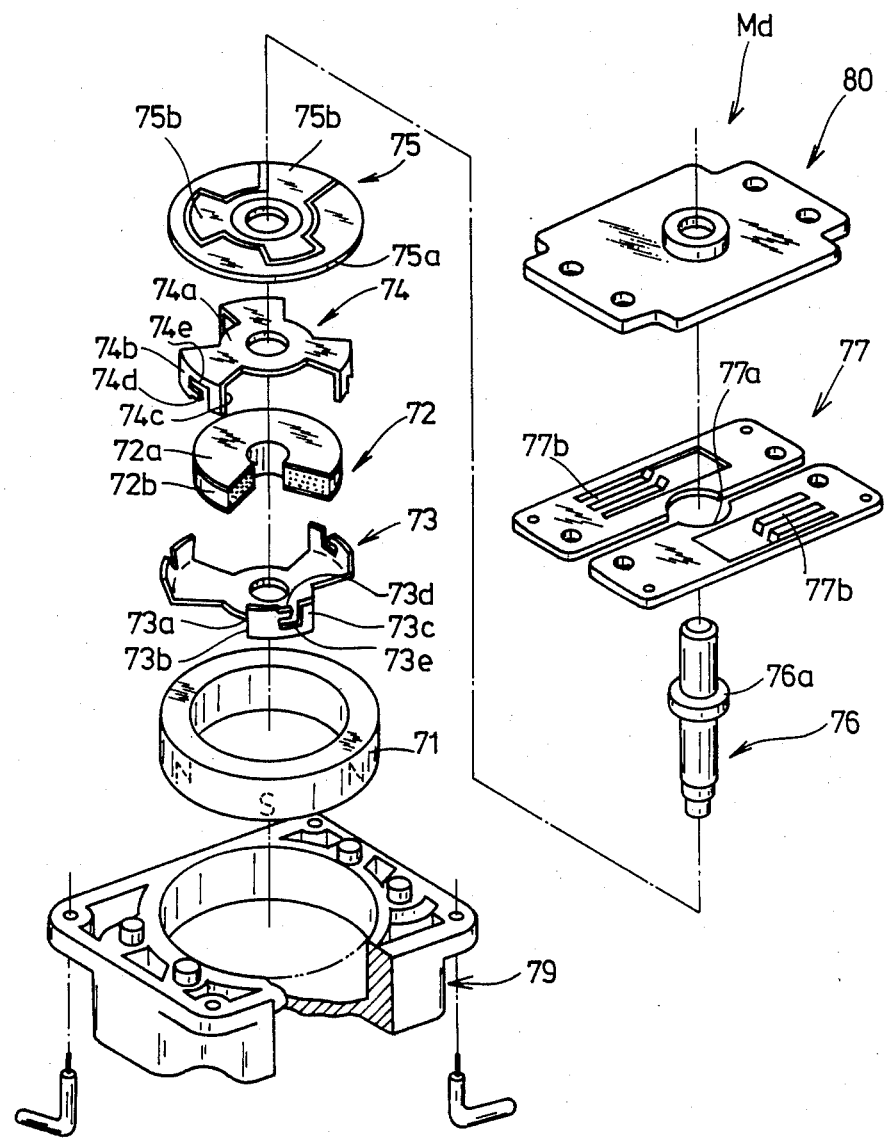
FIG. 20 is a perspective deal drawing of a general-purpose DC motor.

FIG. 20 shows an example of application to a general-purpose DC motor Md, which is easy to construct and has a wide range of practical use. A permanent magnet ring 71, as a stator, has six poles magnetized on its inner circular face so that N and S poles are disposed alternately. Note that adoption of 2(2m+1) poles (m: an integer equal to or more than 1) always results in disposition of magnetic poles of different polarities facing each other.

A coil 72 is formed by winding wire 72b in a circular bobbin 72a having a through-hole for a shaft provided at its center.

A lower core 73 is formed according to the present invention by processing a magnetic material such as iron plate with a press. It consists of a disk section 73a to be placed concentrically under the lower end face of the coil 72 and three assemblies each of a first magnetic-pole piece 73b, a second magnetic-pole piece 73c, an extended section 73d, and a third magnetic-pole piece 73e which extends from the edge of the disk section at intervals of 120° and are bent 90° over the outer circular face of the coil 72.

An upper core 74, like the lower core 72, is formed according to the present invention so as to be placed concentrically on the upper end face of the coil 72, consisting of a disk section 74a, a first magnetic-pole piece 74b, a second magnetic-pole piece 74c, an extended section 74d, and a third magnetic pole piece 74e.

The lower core 73 and upper core 74 are applied on the coil 72 so that the first and second magnetic-pole pieces 73b and 73c are positioned between the first and second magnetic-pole pieces 74b and 74c.

A commutator 75 consists of a disk 75a of an insulating material with a through-hole for a shaft at its center and six commutator bars 75b glued on one face of the disk 75a radially from the center. The commutator bars are connected electrically every two bars to form two groups of commutator bars, each group being connected to the coil 72.

A shaft 76 has a flange 76a provided approximately in the middle in the longitudinal direction.

The shaft 76 has the commutator 75, the upper core 74, the coil 72, and the lower core 73 inserted, and the lower core 73 is clinched at the lower part of the shaft 76 for fixing the assembly.

A brush 77 is a rectangular plate of phosphor-bronze which has an arc-shaped notch 77a as an escape section for the flange 76a formed in the middle of one of the longer sides and which has a sliding contact section 77b to the commutator 75 cut up in the middle of plate. The provision of two sliding contact sections 77b is to secure the contact to the commutator 75.

Two brushes 77 are disposed point-symmetrically with the shaft 76 held inbetween, each sliding contact section 77b being in contact with the groups of bars of the commutator 75.

A case 79 is made of a plastic material and has a cover 80 of a plastic plate attached on its upper face.

The assembly of the components described above is made, as the one-point chain line indicates, by fixing the permanent magnet ring 71 within the case 79, applying the armature, composed of the coil 72, the lower core 73, the upper core 74, the commutator 75, and the shaft 76, on the shaft 76 to set the armature in the middle of the permanent magnet ring 71, positioning the brush 77 on the cover 80, allowing the case 79 to catch the cover 80, and finally applying thermal fusion, etc. for fixation.

The DC motor with such a structure has various advantages that the armature coil, concentrically wound on the shaft, is easy to form, the commutator and brush, both in the form of plate, together with the concentrically-wound armature coil, are effective for system miniaturization, the assembly is very easy since the brush is put between the case and cover to be positioned and fixed, two identical brush pieces may be disposed point-symmetrically with respect to the rotary shaft since the number of poles adopted is set at 2(2m+1), and that the transmission mechanism for the motor rotation may adopt spur gears instead of inefficient worms and worm gears since the flat motor and the facilitation to increase the number of poles allow the speed of rotation to be reduced.

Figure 21:
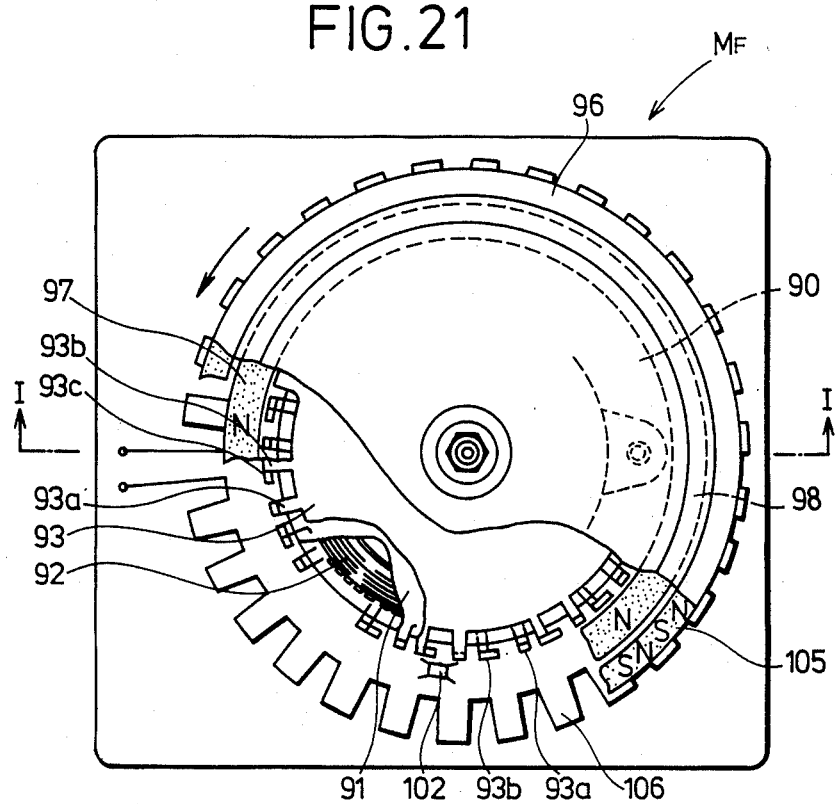
FIG. 21 is a partially-exposed plan of a DC motor for floppy disks.
Figure 22:
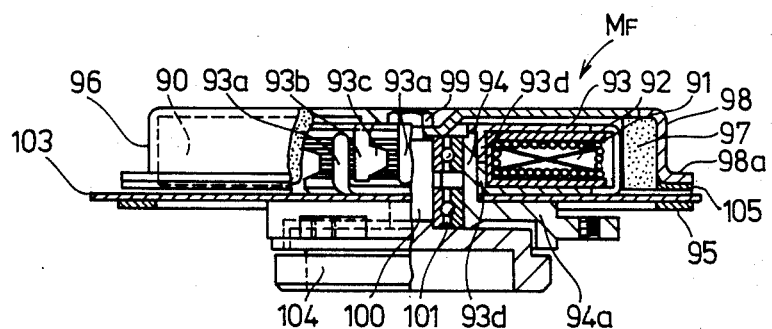
FIG. 22 is a sectional view for the I—I line of FIG. 21.
Figure 23:
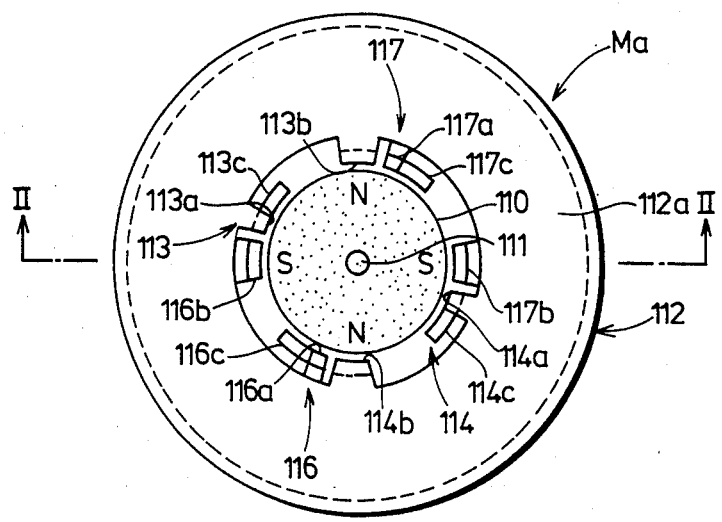
FIG. 23 is an abbreviated plan of an AC motor.
Figure 24:
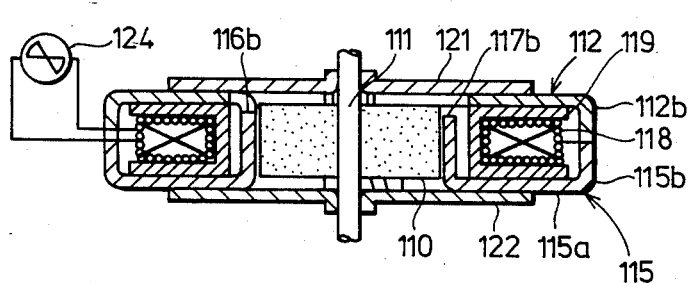
FIG. 24 is a sectional view for the II—II line of FIG. 23.
Figure 25:
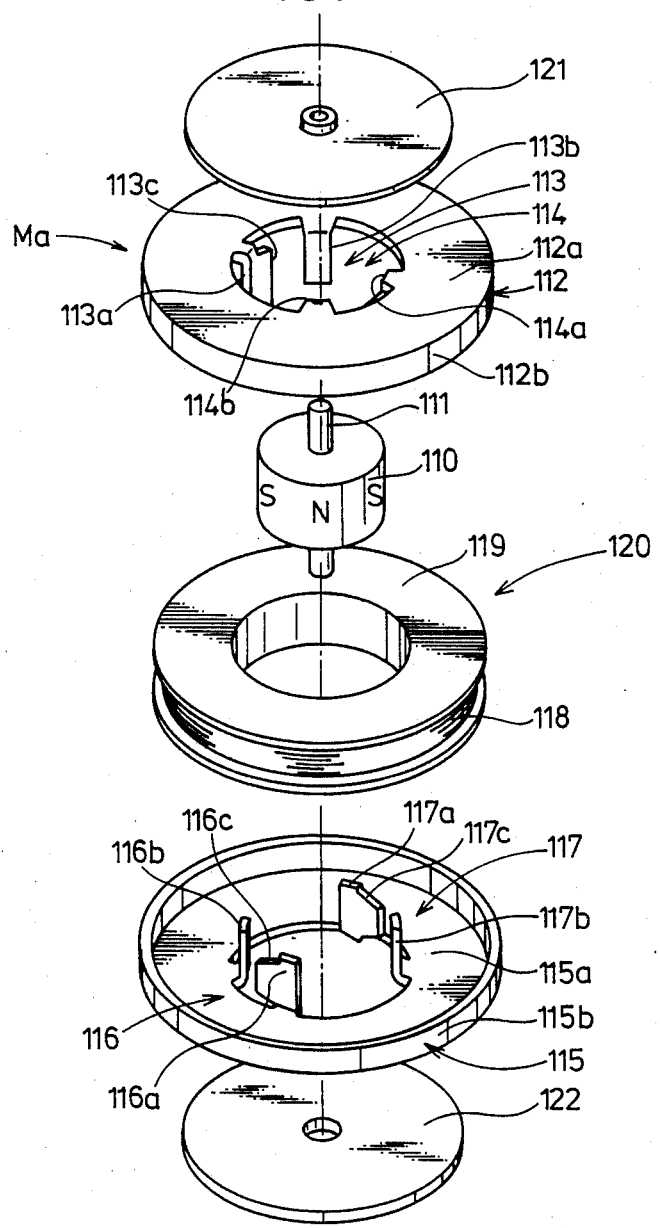
FIG. 25 is a perspective deal drawing of the DC motor of FIG. 23.
Figure 26:
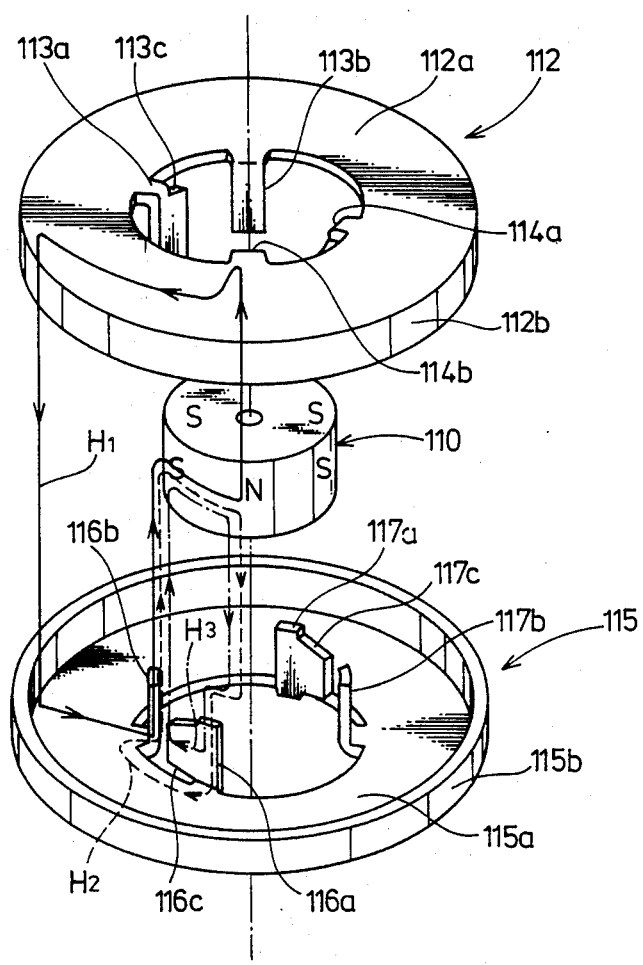
FIG. 26 is a perspective view illustrative of the operation principle of the DC motor of FIG. 23.

FIGS. 21 and 22 refer to a DC motor $M_F$ for a floppy disk to which the magnetic-pole core of the present invention is applied.

An armature 90 consists of a coil 92 concentrically wound on a bobbin 91 and cores 93, covering the coil 92, which have on their faces against the rotor twenty poles so that adjacent poles are opposite in polarity.

The core 93 has poles 93a and poles 93b formed, and the pole 93b has an extended section 93c toward the pole 93a. The core 93 is formed by combining the upper- and lower-side cores so that a closed magnetic circuit is formed on the inner circumferential face of the coil 91. The core is easy to form since the upper and lower cores are subject to a press processing in a body with the poles 93a and 93b and the closed magnetic circuit section 93d.

A fixing piece 94 is put tight on the inner circumferential face of the armature 90; its flange section 94a is fixed on the base plate 95, and the armature 90 is fixed on the base plate 95.

A rotor 96 consists of a permanent magnet ring 97 which is disposed facing the outer circumferential face of the armature 90 and magnetized so that adjacent poles are opposite in polarity, a yoke 98, in a form of cup, which covers the outer circumferential face and one end face of the permanent magnet ring 97 and is attached to the permanent magnet ring, and a shaft 10 fixed by a nut 99 at the center of the flat side face of the yoke 98. The shaft 100 is inserted into a bearing 101 put in contact with the inner circumferential face of the fixing piece 94, with the rotor supported capable of rotation.

The yoke 98 needs to be composed of magnetic material at least at the portion in contact with the circumferential face of the permanent magnet ring 97.

A Hall element 102, which serves to change over the direction of the current to the coil 92 in harmony with the rotation of the magnetic poles of the permanent magnet ring 97, is disposed, on a printed circuit board 103 added to the base plate 95, facing the permanent magnet ring 97.

The Hall element 102 changes over the direction of the current to the coil 92 in harmony with the rotation of the rotor 96, generating alternately different poles at the respective tips of the core 93, thus allowing the rotor 96 to continue to rotate. This in turn allows the rotation of a turn-table which is fixed on the shaft 100 and has a floppy disk (not shown) loaded.

Next, description will be made of the mechanism for monitoring the rotary speed of the rotor 96.

A generating magnet 105, in a form of a flat permanent magnet ring, is attached at a bent section 98a of the yoke 98. The generating magnet 105 has on its flat side face 60 poles magnetized alternately in polarity, the magnetic-pole pitch being smaller than that of the rotor 96.

A generating coil 106 is allowed by the rotation of the generating magnet 105 to generate a voltage, which is proportional to the rotary speed of the rotor 96. The frequency proportional to the rotary speed of the rotor 96 is higher than the number of rotations of the rotor 96, and the magnetic-pole pitch of the generating magnet is smaller than that of the rotor 96. Thus, the rotary speed of the rotor 96 in the interval of magnetic poles of the armature 90 may be measured, which allows the speed control.

The motor $M_F$ is inexpensive since its structure is simple and it requires only one set of the Hall element and a part of circuits. Especially, a motor for a 3.5" floppy disk will be more inexpensive since, unlike a conventional plane-facing type, no load is generated in the axial direction and no expensive ball bearings need to be used.

FIGS. 23-26 refer to an example of an AC motor Ma. A permanent magnet rotor 110, i.e., a permanent magnet in a form of cylinder, has two N and two S poles magnetized alternately at equal intervals around the cylinder. This rotor 110 has a shaft 111 inserted at its center.

An upper core 112 has a flange 112b bent at an approximately right angle downward from the outer edge of a circular ring 112a. The upper core 112 has a circular opening at its middle, and its inner edge has magnetic poles 113 and 114, bent downward at a right angle, formed in a body. These magnetic poles 113 and 114 are disposed facing each other with a 180° positional relation and each divided into two subsections perpendicular to the circumferential direction, one being wide and the other narrow; thus, we have first magnetic-pole pieces 113a and 114a and second magnetic-pole pieces 113b and 114b. The first magnetic-pole piece 113a (as well as 114a) is provided with an extended section 113c toward the second magnetic-pole piece 113b to make both the first and second magnetic-pole pieces magnetically asymmetric in form.

A lower core 115 has a flange 115b bent at an approximately right angle upward from the outer edge of a circular ring 115a. The end face of this flange 115b is in contact with the end face of the flange 112b. The upper core 112 has a circular opening at its middle, and its inner edge has magnetic poles 116 and 117, bent upward at a right angle, formed in a body. These magnetic poles 116 and 117, in the same form as the magnetic poles 113 and 114, are positioned with a 90° phase displacement relative to the magnetic poles 113 and 114. FIGS. 116a and 117a refer to first magnetic-pole pieces, 116b and 117b to second magnetic-pole pieces, and 116c and 117c to extended sections.

The positional relation among the magnetic poles 113, 114, 116, and 117 is such that the magnetic poles 113 and 114 on the upper core 112 and the magnetic poles 116 and 117 on the upper core 115 are alternately disposed, surrounding with prescribed gaps the circumferential face of the rotor 110. There will be an above-mentioned slight angular clearance on each magnetic pole, e.g., 113 and 116.

The assembly of an armature 120 is completed by setting a circular bobbin 119 with a concentrically-wound coil 118 between the rings 112a and 115a.

Upper and lower board bearings 121 and 122, made of a non-magnetic material, have a form of disk.

The above-described structure allows us to avoid the start-up dead-point since we may change the forms of the first and second magnetic-pole pieces to adjust to a considerable extent the rotary torque characteristic under no passage of current, dependent on the attractive force of the magnet, and the positional relation, at spontaneous stop, between the magnetic-pole core and the magnetized pole on the permanent magnet ring.

A supply of AC power from an AC power supply 124 to the coil 118 allows the magnetic poles 113, 114, 116, and 117 to change alternately between N and S poles, thus arranging a synchronous motor, the rotary direction of which, as with the example described above, may be adjusted by selecting the form and position of each magnetic-pole piece. The adjustment of the rotary direction is made possible since the magnetic circuits are combined in such a complex manner that change of relative forms of the first and second magnetic-pole pieces will result in the characteristic of the magnetic circuits. The sequence for this change will be described below by reference to FIG. 26.

The magnetic circuits under no passage of current are as follows:

①(Solid line $H_1$ with arrows) The N pole of rotor 110→the second magnetic-pole piece 114 of upper core 112→ring 112a→flange 112b→flange 115b→ring 115a→the second magnetic-pole piece 116b of lower core 115→the S pole of rotor 110→the N pole of rotor 110.

②(Dotted line $H_2$ with arrows) The N pole of rotor 110→the first magnetic-pole piece 116a of lower core 115→ring 115a→the second magnetic-pole piece 116b of lower core 115→the S pole of rotor 110 →the N pole of rotor 110.

③(Chain line $H_3$ with arrows) The N pole of rotor 110→the first magnetic-pole piece 116a of lower core 115→extended section 116c→the S pole of rotor 110→the N pole of rotor 110.

The above three magnetic circuits may be regarded as dominant, although in general a magnetic circuit produces so much leaking magnetic flux as to make it difficult to grasp the magnetic circuit itself. This is the case with the other magnetic poles.

The spontaneous stop position, relative to the magnetic pole 113 under no passage of current, of the rotor 110 depends on the ratio of the attractive forces generated in the above magnetic circuits 1 – 3 . Thus, as the extended section 113c is lengthened, the effect of the magnetic circuit 3 is increased, attracting the S pole of the rotor 110 toward the front end of the extended section 113 by more than the angle for the extension. As a result, with passage of current, the rotor 110 will be caused to rotate away from the field magnet pole which is located at the smaller angle from the spontaneous stop position of the armature. In this situation, the motor output is high and accordingly the efficiency is good.

When initially a wave form is input which causes a rotation in the direction opposite to the normal one, both the centers of the magnetic poles of rotor 110 and armature 120 are attracted in that opposite direction, a delicate relation of attraction due to inertia resulting in some deviation. It is, therefore, required for the inertia not to cause too much deviation, which requirement is satisfied by adjusting system parameters in accord with the magnitude of power input, load, etc.

Figure 27:
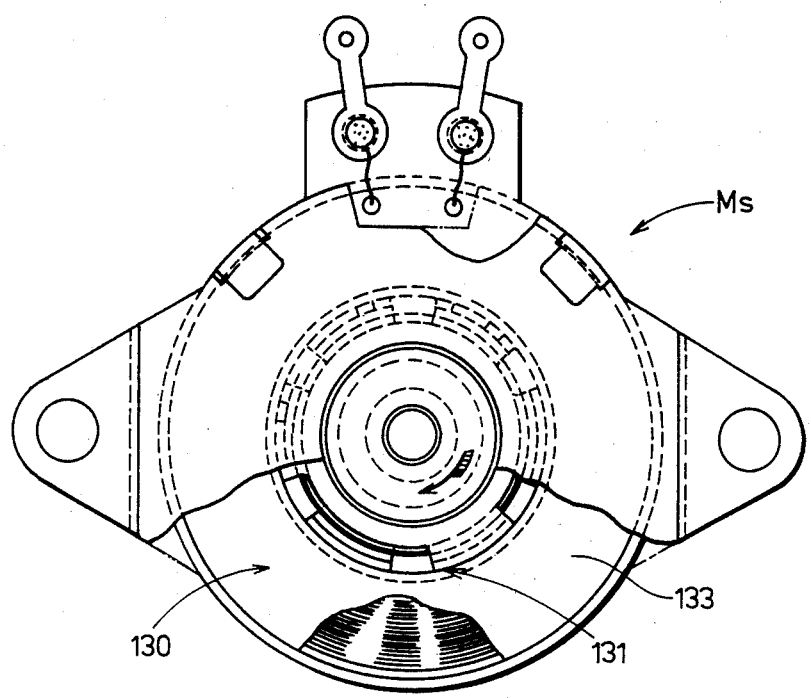
FIG. 27 is a partially-exposed plan of a stepping motor.
Figure 28:
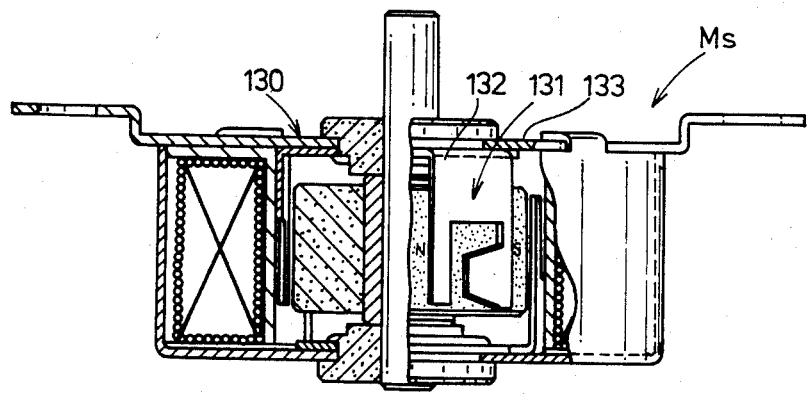
FIG. 28 is a longitudinal sectional view for FIG. 27.

FIGS. 27 and 28 refer to an example of a stepping motor $M_s$. The stepping motor has the same structure as the AC motor Ma shown in FIGS. 23-25. Thus, when pulse waves are successively input into the coil 118 shown in FIG. 24, the motor Ma is caused to rotate successively by a constant angle. The basic structure of the stepping motor shown in FIG. 27 is the same with the motor shown in FIG. 24, a difference being that a magnetic-pole section piece 132 containing a magnetic-pole section 131 is formed separately from a base section 133, both being combined to constitute a magnetic-pole core 130. Such a structure may eliminate the disadvantages inherent in the one-body core of FIG. 26: The core of FIG. 26 has its inner circular section bent to form the magnetic pole 113, etc. so that the magnetic-pole section is under restrictions with respect to the form (e.g., the height cannot be made so tall), the number of poles (poles cannot be increased so much in number), etc. but the use of the magnetic-pole section piece 132, which allows the formation of magnetic-pole section by bending its outer circumferential side, has led to the successful elimination of the above-mentioned disadvantages.

Various embodiments and uses have been described, but the present invention is not, of course, limited to them. Thus, arbitrary forms may be applied to the first, second, and third magnetic-pole pieces and the extended section, and the set position and number of extended sections may be arbitrary (e.g., two sections in parallel setting). In addition to the motors described, a wide range of electrorotary machines may utilize the present invention such as the fan motor, car loading motor, timer motor, conduit motor, and rotary plunger. The structure of electrorotary machines such as the inneror outer-rotor type will impose no restriction. Any other modifications not deviating from the spirit of the present invention may be considered as being within the scope of the present invention.

What is claimed is:

1. In a magnetic pole structure for a rotary electric machine, including an armature having a pair of base board sections with a concentrically wound coil mounted therebetween and a plurality of magnetic pole sections extending from the edge of each of said base board section over the outer circular face of said coil and radially spaced therefrom, said pole sections extending over said coil alternately from said base board sections, and a field magnet surrounding said armature; the improvement wherein each said magnetic pole section is divided into first and second magnetic pole pieces spaced from one another in the circumferential direction of said coil, one of said magnetic pole pieces having an extended section extending circumferentially of said coil from the respective pole piece to provide substantially peak attractive torque between the magnet and pole sections when the magnetic pole centers of the pole sections coincide with the magnetic pole centers of the field magnet, whereby said attractive torque with no current passing through the coil slightly exceeds the startup load torque when the magnetic pole centers of the magnetic pole sections coincide with the magnetic pole centers of the field magnet.

2. The magnetic pole structure of claim 1 wherein said extended sections are trapezoidal with decreasing widths in the circumferential direction of the armature away from the respective pole pieces.

3. In a magnetic pole structure for a rotary electric machine, including an armature having a pair of base board sections with a concentrically wound coil mounted therebetween and a plurality of magnetic pole sections extending from the edge of each of said base board section over the outer circular face of said coil and radially spaced therefrom, said pole sections extending over said coil alternately from said base board sections, and a field magnet surrounding said armature; the improvement wherein each said magnetic pole section is divided into first and second magnetic pole pieces spaced from one another in the circumferential direction of said coil, one of said magnetic pole pieces having an extended section extending circumferentially of said coil from the respective pole piece to provide substantially peak attractive torque between the magnet and pole sections when the magnetic pole centers of the pole sections coincide with the magnetic pole centers of the field magnet, whereby said attractive torque with no current passing through the coil slightly exceeds the startup load torque when the magnetic pole centers of the magnetic pole sections coincide with the magnetic pole centers of the field magnet, said extended sections being trapezoidal with decreasing widths in the circumferential direction of the armature away from the respective pole pieces and separate extending sections extend toward one another from said first and second pole pieces of each pole section.

4. In a magnetic pole structure for a rotary electric machine, including an armature having a pair of base board sections with a concentrically wound coil mounted therebetween and a plurality of magnetic pole sections extending from the edge of each of said base board section over the outer circular face of said coil and radially spaced therefrom, said pole sections extending over said coil alternately from said base board sections, and a field magnet surrounding said armature; the improvement wherein each said magnetic pole section is divided into first and second magnetic pole pieces spaced from one another in the circumferential direction of said coil, one of said magnetic pole pieces having an extended section extending circumferentially of said coil from the respective pole piece to provide substantially peak attractive torque between the magnet and pole sections when the magnetic pole centers of the pole sections coincide with the magnetic pole centers of the field magnet, whereby said attractive torque with no current passing through the coil slightly exceeds the startup load torque when the magnetic pole centers of the magnetic pole sections coincide with the magnetic pole centers of the field magnet, said extended sections being trapezoidal with decreasing widths in the circumferential direction of the armature away from the respective pole pieces and separate extending sections extend in opposite direction with respect to one another from said first and second pole pieces of each pole section.

5. The magnetic pole structure of claim 1 wherein said extended sections are trapezoidal and extend from each circumferential edge of said first and second sections, with narrowing widths circumferentially therefrom.

6. The magnetic pole structure of claim 1 wherein said base board sections and pole sections comprise a unitary structure.

7. The magnetic pole structure of claim 1 wherein said base board sections and pole sections comprise separate sections that are joined together.

8. In a magnetic pole structure for a rotary electric machine, including an armature having a pair of base board sections with a concentrically wound coil mounted therebetween and a plurality of magnetic pole sections extending from the edge of each of said base board section over the outer circular face of said coil and radially spaced therefrom, said pole sections extending over said coil alternately from said base board sections, and a field magnet surrounding said armature; the improvement wherein each said magnetic pole section is divided into first and second magnetic pole pieces spaced from one another in the circumferential direction of said coil, one of said magnetic pole pieces having an extended section extending circumferentially of said coil from the respective pole piece to provide substantially peak attractive torque between the magnet and pole sections when the magnetic pole centers of the pole sections coincide with the magnetic pole centers of the field magnet, whereby said attractive torque with no current passing through the coil slightly exceeds the startup load torque when the magnetic pole centers of the magnetic pole sections coincide with the magnetic pole centers of the field magnet, each pole section further having a third magnetic pole piece between the respective first and second pole pieces and being shorter in the axial direction of said electric machine than the respective first and second sections.

9. The magnetic pole structure of claim 8 wherein said third magnetic pole piece section is formed continuously with said first and second magnetic pole piece.

10. The magnetic pole structure of claim 8 wherein an extended section is provided on one of the two mutually facing axially extending edges of one of said first and second pole pieces and the edge thereof toward said third magnetic pole piece is continuous with said third magnetic pole piece.

11. The magnetic pole structure of claim 8 wherein said extended sections are trapezoidal with decreasing widths away from the respective pole piece from which they extend 12. The magnetic pole structure of claim 8 wherein said extended sections are trapezoidal and extend from facing edges of said first and second pole pieces with decreasing widths toward one another.

13. The magnetic pole structure of claim 8 wherein said extended sections are trapezoidal and extend from two edges of said pole pieces that are not facing, with decreasing widths.

14. The magnetic pole structure of claim 8 wherein said extended sections are trapezoidal and extend from each axially extending edge of said first and second pole pieces with decreasing width.

15. In a magnetic pole structure for a rotary electric machine, including an armature having a pair of base board sections with a concentrically wound coil mounted therebetween and a plurality of magnetic pole sections extending from the edge of each of said base board section over the outer circular face of said coil and radially spaced therefrom, said pole sections extending over said coil alternately from said base board sections, and a field magnet surrounding said armature; the improvement wherein a part of each said magnetic pole section is divided into first and second magnetic pole pieces spaced from one another in the circumferential direction of said coil, one of said magnetic pole pieces having an extended section extending circumferentially of said coil from the respective pole piece to provide substantially peak attractive torque between the magnet and pole sections when the magnetic pole centers of the pole sections coincide with the magnetic pole centers of the field magnet, whereby said attractive torque with no current passing through the coil slightly exceeds the startup load torque when the magnetic pole centers of the magnetic pole sections coincide with the magnetic pole centers of the field magnet.

16. The magnetic pole structure of claim 15 wherein said extended sections are trapezoidal with decreasing widths in the circumferential direction of the armature away from the respective pole pieces.

17. In a magnetic pole structure for a rotary electric machine, including an armature having a pair of base board sections with a concentrically wound coil mounted therebetween and a plurality of magnetic pole sections extending from the edge of each of said base board section over the outer circular face of said coil and radially spaced therefrom, said pole sections extending over said coil alternately from said base board sections, and a field magnet surrounding said armature; the improvement wherein a part of each said magnetic pole section is divided into first and second magnetic pole pieces spaced from one another in the circumferential direction of said coil, one of said magnetic pole pieces having an extended section extending circumferentially of said coil from the respective pole piece to provide substantially peak attractive torque between the magnet and pole sections when the magnetic pole centers of the pole sections coincide with the magnetic pole centers of the field magnet, whereby said attractive torque with no current passing through the coil slightly exceeds the startup load torque when the magnetic pole centers of the magnetic pole sections coincide with the magnetic pole centers of the field magnet, said extended sections being trapezoidal with decreasing widths in the circumferential direction of the armature away from the respective pole pieces and separate extending sections extend toward one another from said first and second pole pieces of each pole section.

18. In a magnetic pole structure for a rotary electric machine, including an armature having a pair of base board sections with a concentrically wound coil mounted therebetween and a plurality of magnetic pole sections extending from the edge of each of said base board section over the outer circular face of said coil and radially spaced therefrom, said pole sections extending over said coil alternately from said base board sections, and a field magnet surrounding said armature; the improvement wherein a part of each said magnetic pole section is divided into first and second magnetic pole pieces spaced from one another in the circumferential direction of said coil, one of said magnetic pole pieces having an extended section extending circumferentially of said coil from the respective pole piece to provide substantially peak attractive torque between the magnet and pole sections when the magnetic pole centers of the pole sections coincide with the magnetic pole centers of the field magnet, whereby said attractive torque with no current passing through the coil slightly exceeds the startup load torque when the magnetic pole centers of the magnetic pole sections coincide with the magnetic pole centers of the field magnet, said extended sections being trapezoidal with decreasing widths in the circumferential direction of the armature away from the respective pole pieces and separate extending sections extend in opposite direction with respect to one another from said first and second pole pieces of each pole section.

19. The magnetic pole structure of claim 15 wherein said extended sections are trapezoidal and extend from each circumferential edge of said first and sections, with narrowing widths circumferentially therefrom.

20. The magnetic pole structure of claim 15 wherein said base board sections and pole sections comprise a unitary structure.

* * * * *